United States Patent
Ono et al.

(10) Patent No.: US 11,750,052 B2
(45) Date of Patent: Sep. 5, 2023

(54) ROTATING ELECTRIC MACHINE ROTOR

(71) Applicant: TOYOTA JIDOSHA KABUSHIKI KAISHA, Toyota (JP)

(72) Inventors: Koichi Ono, Toki (JP); Hiroaki Kodera, Susono (JP); Keiichi Kaneshige, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 17/569,727

(22) Filed: Jan. 6, 2022

(65) Prior Publication Data
US 2022/0263363 A1     Aug. 18, 2022

(30) Foreign Application Priority Data
Feb. 17, 2021     (JP) ................................ 2021-023133

(51) Int. Cl.
*H02K 1/28* (2006.01)
*H02K 15/14* (2006.01)
*H02K 15/02* (2006.01)

(52) U.S. Cl.
CPC ............... *H02K 1/28* (2013.01); *H02K 15/02* (2013.01); *H02K 15/14* (2013.01)

(58) Field of Classification Search
CPC .......... H02K 1/28; H02K 15/02; H02K 15/14; H02K 1/22; H02K 1/2706
See application file for complete search history.

(56) References Cited

U.S. PATENT DOCUMENTS

| | | | |
|---|---|---|---|
| 2014/0041207 A1* | 2/2014 | Matsushita | H02K 15/02 29/598 |
| 2019/0115812 A1* | 4/2019 | Kinpara | H02K 7/003 |
| 2022/0077737 A1* | 3/2022 | Büttner | H02K 7/003 |

FOREIGN PATENT DOCUMENTS

| | | |
|---|---|---|
| JP | 2006-217770 A | 8/2006 |
| JP | 2014-064409 A | 4/2014 |

* cited by examiner

*Primary Examiner* — Thomas Truong
(74) *Attorney, Agent, or Firm* — Oliff PLC

(57) ABSTRACT

A rotating electric machine rotor according to the present disclosure includes: a rotor shaft extending in a direction of an axis of rotation; and a rotor core fixedly fitted to an outer circumference of the rotor shaft and formed of laminated steel sheets. Further, an inner diameter of the rotor core is smaller than an outer diameter of the rotor shaft. Furthermore, an inner edge part of each laminated steel sheet is made thinner than an outer edge part thereof, and the inner edge part abuts on an outer peripheral surface of the rotor shaft and is curved along the outer peripheral surface of the rotor shaft in the direction of the axis of rotation.

3 Claims, 6 Drawing Sheets

ROTATING ELECTRIC MACHINE ROTOR

CROSS REFERENCE TO RELATED APPLICATIONS

This application is based upon and claims the benefit of priority from Japanese patent application No. 2021-023133, filed on Feb. 17, 2021, the disclosure of which is incorporated herein in its entirety by reference.

BACKGROUND

The present disclosure relates to a rotating electric machine rotor.

In a rotating electric machine, a phenomenon may occur in which the rotor shaft and the rotor core that are fixedly fitted to each other are detached from each other due to the centrifugal force caused by high speed rotation of the rotor. In order to solve the problem mentioned above, the inner diameter of the rotor core may be made smaller than the outer diameter of the rotor shaft, however, by merely making the inner diameter of the rotor core smaller than the outer diameter of the rotor shaft causes the rotor core to be easily damaged. Japanese Unexamined Patent Application Publication No. 2014-64409 discloses a technique for making the outer peripheral surface of the rotor shaft polygonal in cross section.

SUMMARY

By making the outer peripheral surface of the rotor shaft polygonal in cross section like in the technique disclosed in Japanese Unexamined Patent Application Publication No. 2014-64409, stress concentrates at the corners of the outer peripheral surface of the rotor shaft, which may cause deterioration or the like of the rotor core.

The present disclosure has been made in order to solve the problem mentioned above, and an object of the present disclosure is to provide a rotating electric machine rotor adapted to reduce the stress load on the rotor core while maintaining the restraining between the rotor shaft and the rotor core even when the rotor is rotating at a high speed.

A rotating electric machine rotor according to the present disclosure includes:

a rotor shaft extending in a direction of an axis of rotation; and a rotor core fixedly fitted to an outer periphery of the rotor shaft and formed of laminated steel sheets, in which an inner diameter of the rotor core is smaller than an outer diameter of the rotor shaft, and an inner edge part of each laminated steel sheet is made thinner than an outer edge part thereof, and the inner edge part abuts on an outer peripheral surface of the rotor shaft and is curved along the outer peripheral surface of the rotor shaft in the direction of the axis of rotation.

According to the present disclosure, a rotating electric machine rotor adapted to reduce the stress load on the rotor core while maintaining the restraining between the rotor shaft and the rotor core even when the rotor is rotating at a high speed can be provided.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinbelow, embodiments will be described with reference to the drawings. Note that since the drawings are simplified, the technical scope of the embodiments should not be construed narrowly on the basis of the descriptions of these drawings. Further, the identical reference symbols denote the identical structural elements and redundant explanation thereof is omitted. Further, in the following description, when the numbers and the like (including numbers, numerical values, quantity, ranges, and the like) of the structural elements are mentioned, the numbers are not limited to the stated specific numbers and may be numbers larger than those specific numbers unless specifically stated otherwise or unless it is obvious that the numbers should be limited to the stated specific numbers.

Hereinbelow, for the sake of clarification, explanation will be given below with reference to an xyz three-dimensional orthogonal coordinate system. The z-direction is the thickness direction of the rotor and is a laminating direction of the laminated steel sheets. The xy plane is a plane parallel to the rotor and to the main surface of the laminated steel sheets. Further, while explanation will be given on the assumption that the positive z-direction is the upward direction, the direction may vary depending on the orientation of the rotating electric machine.

First Embodiment

Figure 1:
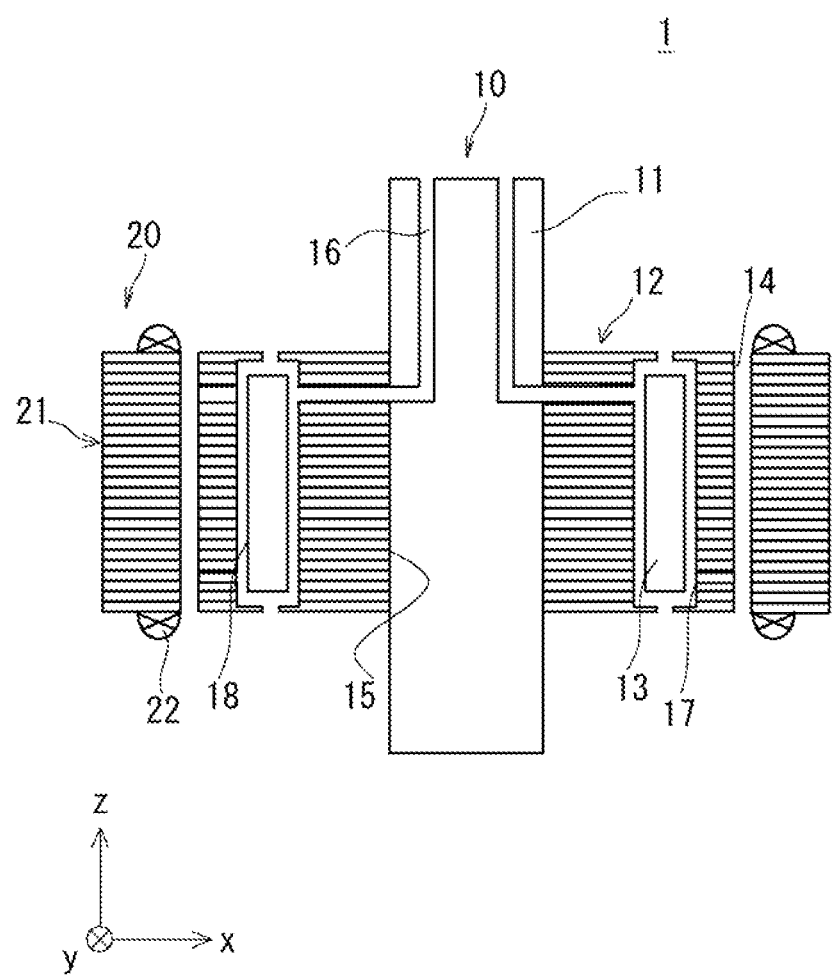
FIG. 1 is a vertical cross-sectional diagram of a rotating electric machine in which a rotating electric machine rotor according to a first embodiment of the present disclosure is used.
Figure 2:
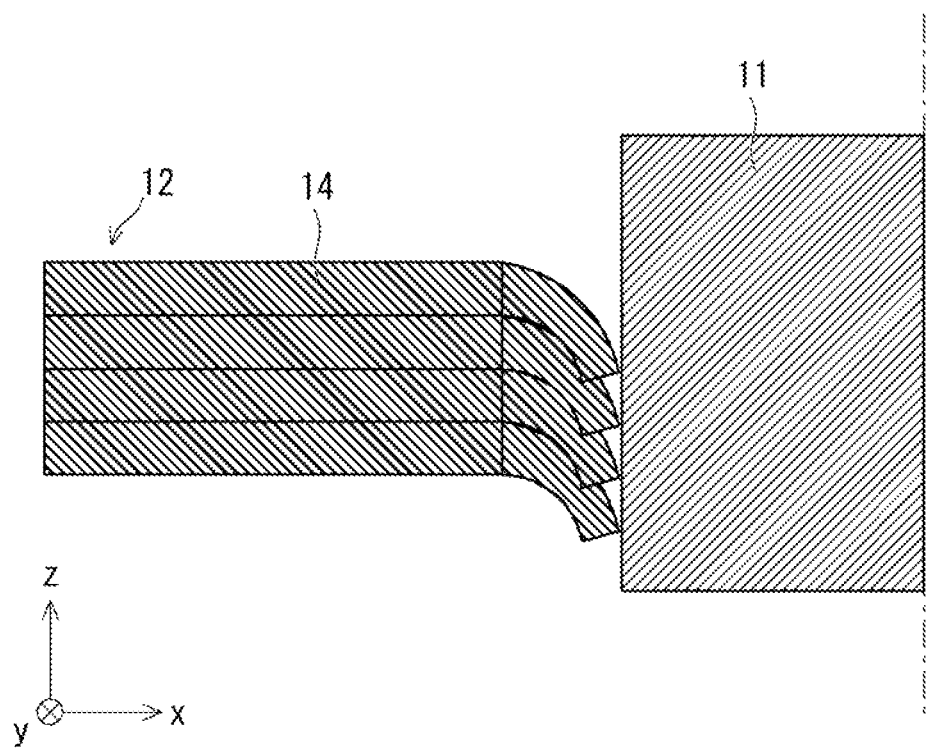
FIG. 2 is a vertical cross-sectional diagram of a fastening unit of a rotor shaft and a rotor core when the rotating electric machine rotor according to the first embodiment of the present disclosure is at rest.
Figure 3:
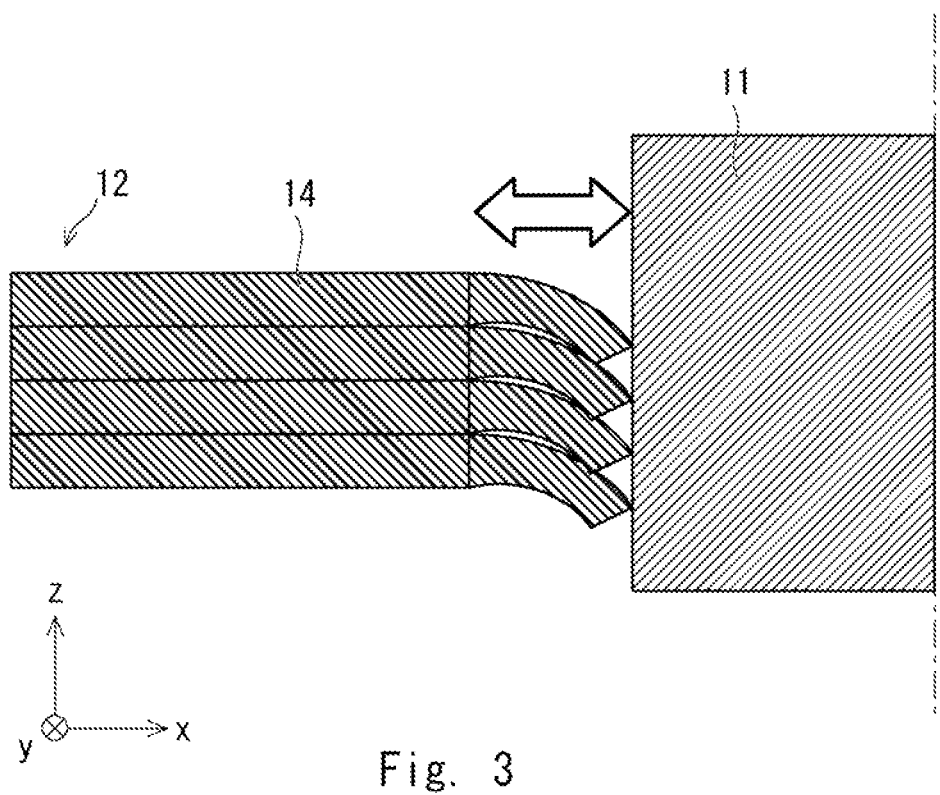
FIG. 3 is a vertical cross-sectional diagram of the fastening unit of the rotor shaft and the rotor core when the rotating electric machine rotor according to the first embodiment of the present disclosure is rotating at a high speed.
Figure 4:
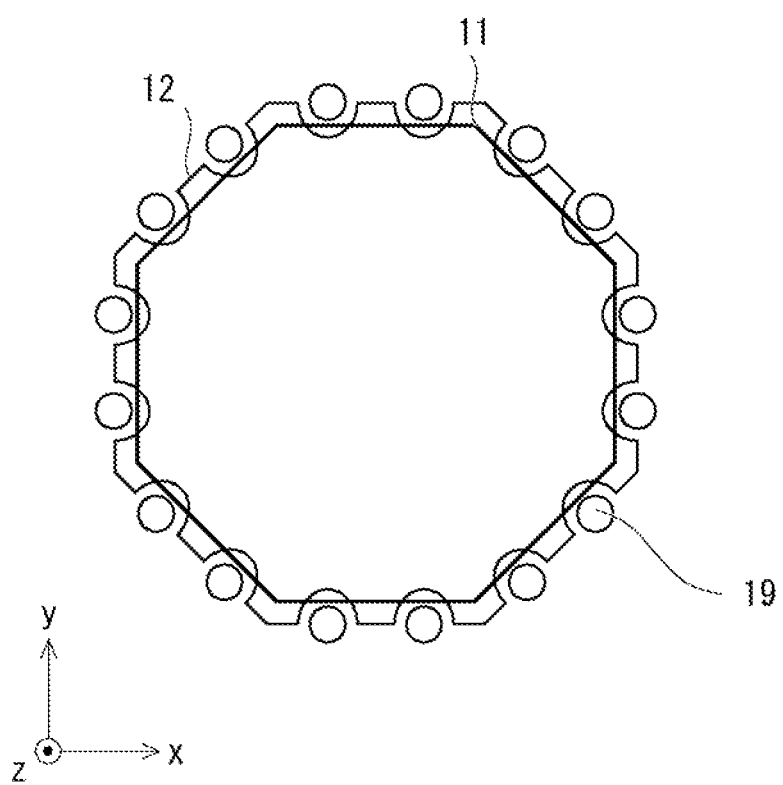
FIG. 4 is a horizontal cross-sectional diagram of the fastening unit of the rotor shaft and the rotor core of the rotating electric machine rotor according to the first embodiment of the present disclosure.

A rotating electric machine rotor 10 according to a first embodiment will be described with reference to FIGS. 1, 2, and 3. FIG. 1 is a vertical cross-sectional diagram of a rotating electric machine 1 in which the rotating electric machine rotor 10 according to the first embodiment is used. FIG. 2 is a vertical cross-sectional diagram of a fastening unit of a rotor shaft 11 and a rotor core 12 when the rotating electric machine rotor 10 according to the first embodiment is at rest. Further, FIG. 3 is a vertical cross-sectional diagram of the fastening unit of the rotor shaft 11 and the rotor core 12 when the rotating electric machine rotor 10 according to the first embodiment is rotating at a high speed. Furthermore, FIG. 4 is a horizontal cross-sectional diagram of the fastening unit of the rotor shaft 11 and the rotor core 12 of the rotating electric machine rotor 10 according to the first embodiment.

The rotating electric machine 1 shown in FIG. 1 is configured of the rotating electric machine rotor 10 according to the first embodiment and a stator 20. The rotating electric machine rotor 10 includes the rotor shaft 11 and the rotor core 12. The rotor core 12 includes a magnet 13. Further, the stator 20 includes a stator core 21 and a coil 22. The rotor core 12 is configured of laminated steel sheets 14.

As shown in FIG. 1, the rotor shaft 11 is a pipe-shaped member extending in the positive z-direction and is extended in the direction of the axis of rotation of the rotating electric machine rotor 10. The rotor shaft 11 is inserted into a shaft hole 15 provided in the rotor core 12. The rotor shaft 11 can be made of metal such as low carbon steel or iron-based alloy. A refrigerant path 16 is provided inside the rotor shaft 11. At this time, the rotating electric machine rotor 10 can be cooled by causing a refrigerant to flow through the refrigerant path 16.

As shown in FIG. 1, the rotor core 12 is fixedly fitted to the outer periphery of the rotor shaft 11 and is configured of the laminated steel sheets 14. The rotor core 12 is formed by laminating the laminated steel sheets 14 that are punched in an annular shape in the upward direction (the positive z-direction). The plurality of the laminated steel sheets 14 that configure the rotor core 12 are integrally connected with one another by bonding, welding, or the like. In order to minimize the energy loss due to the eddy current generated inside the rotor core 12, the laminated steel sheets 14 that configure the rotor core 12 may be electrically insulated from one another by an insulating film formed on the surface of both sides of each laminated steel sheet 14.

As shown in FIG. 1, the magnet 13 is inserted into a magnet hole 17 that extends in the circumferential direction of the outer edge part of the laminated steel sheets 14 and the magnet hole 17 is sealed with a magnet fixing member 18. A revolving magnetic field is generated by the current flowing through the coil 22, and the rotating electric machine rotor 10 rotates due to the electromagnetic action between the revolving magnetic field and the rotor core 12.

Here, there is a problem that a gap is prone to be created in the fastening unit of the rotor shaft 11 and the rotor core 12 due to the centrifugal force generated when the rotor core 12 rotates at high speed. Due to creation of the gap, a possibility of rotational phase shift or disassembly between the rotor shaft 11 and the rotor core 12 when the rotor core 12 is rotating at a high speed may arise. In order to solve the problem mentioned above, there is a method of making the outer diameter of the rotor shaft 11 smaller than the inner diameter of the rotor core 12. However, by employing the configuration described above, there arises a new problem that the rotor core 12 is prone to be easily damaged.

In order to solve the problem mentioned above, the inner edge part of each laminated steel sheet 14 that configures the rotor core 12 according to the first embodiment is made thinner than the outer edge part thereof as shown in FIGS. 2 and 3. Here, the inner diameter of the rotor core 12 is smaller than the outer diameter of the rotor shaft 11. Therefore, when the rotor shaft 11 is inserted in the shaft hole 15 of the laminated steel sheets 14, the inner edge part of each laminated steel sheet 14 is abuts on the outer peripheral surface of the rotor shaft 11 and is curved along the outer peripheral surface of the rotor shaft 12 in the direction of the axis of rotation. As a result, as shown in FIG. 2, when the rotor core is at rest, the inner edge part of each laminated steel sheet 14 comes in contact with the outer peripheral surface of the rotor shaft 11 while deforming elastically like a spring.

Here, the outer peripheral surface of the rotor shaft 11 according to the first embodiment and the inner peripheral surface of the rotor core 12 according to the first embodiment have an octagonal shape, respectively. A shape that is octagonal in cross section may be a shape with rounding-processed (R-processed) corners or a shape with chamfered corners. Note that the shape of the outer peripheral surface of the rotor shaft 11 and the shape of the inner peripheral surface of the rotor core 12 are not limited to the octagonal shape and may be any other polygonal shape. By adopting a polygonal shape for the rotor shaft and the rotor core like the rotor shaft 11 and the rotor core 12 according to the first embodiment, there is no need to perform compaction with a nut.

As shown in FIG. 3, when the rotor core 12 is rotating at a high speed, the curved part of each laminated steel sheet 14, that is, the inner edge part of each laminated steel sheet 14 that is deformed elastically like a spring expands and contracts in accordance with the number of rotations of the rotor core 12, that is, the magnitude of the centrifugal force. Therefore, when the rotor core 12 is rotating at a high speed, the rotor core 12 comes in close contact with the rotor shaft 11 and the rotor core 12 and the rotor shaft 11 continue to restrain each other. As a result, the rotational phase shift or disassembly between the rotor shaft 11 and the rotor core 12 when the rotor core 12 is rotating at a high speed can be suppressed. Further, the inner edge part of each laminated steel sheet 14 that is formed thinly comes in close contact with the rotor core 12 while deforming elastically, whereby the restraining between the rotor shaft and the rotor core is maintained and the stress load on the rotor core can be reduced.

As shown in FIG. 4, both the outer peripheral surface of the rotor shaft 11 and the inner peripheral surface of the rotor core 12 according to the first embodiment have an octagonal shape. Note that the shapes the above-mentioned surfaces are not limited to an octagonal shape and may be any other polygonal shape. Like the rotor shaft 11 and the rotor core 12 according to the first embodiment, by making the outer peripheral surface of the rotor shaft and the inner peripheral surface of the rotor core polygonal in cross section, there is no need to perform compaction with a nut.

Further, as shown in FIG. 4, the rotor core 12 has recesses and projections formed on the inner peripheral surface thereof. Each corner part of the rotor core 12 is formed to be the recessed part of the recesses and the projections. Concentration of the stress at the corner parts of the rotor core 12 having an octagonal shape may be a cause of deterioration or the like of the rotor core, however by forming the corner parts to be the recessed parts, it is possible to suppress concentration of the stress at the corner parts when the rotor core 12 is rotating at a high speed. Therefore, by forming recesses and projections on the inner peripheral surface of the rotor core 12, it is possible to avoid the laminated steel sheets 14 from being locally deformed whereby cracking of the laminated steel sheets 14 due to deformation thereof can be prevented. Accordingly, the rotor shaft 11 and the rotor core 12 are configured to be less prone to be damaged.

Further, as shown in FIG. 4, a penetration hole 19 extending in the direction of the axis of rotation of the rotating electric machine 10 is provided in each projected part of the rotor core 12. Here, the projected parts formed to the inner edge part of the rotor core 12, namely, to the inner edge part of each laminated steel sheet 14, are curved and deformed elastically like a spring as shown in FIGS. 2 and 3. By providing the penetration holes 19 in the rotor core 12, it is possible to suppress the iron loss increase due to stress when the rotor core 12 is rotating at a high speed. Further, if the laminated steel sheets 14 are thick, the laminated steel sheets 14 have rigidity, thereby the limited steel sheets 14 are prone to be cracked when inserting the rotor shaft 11 into the rotor core 12. Therefore, by providing the penetration holes 19, the inner edge part of each laminated steel sheet 14 can be easily curved whereby it is possible to suppress cracking of the laminated steel sheets 14 when inserting the rotor shaft 11 into the rotor core 12.

Figure 5:
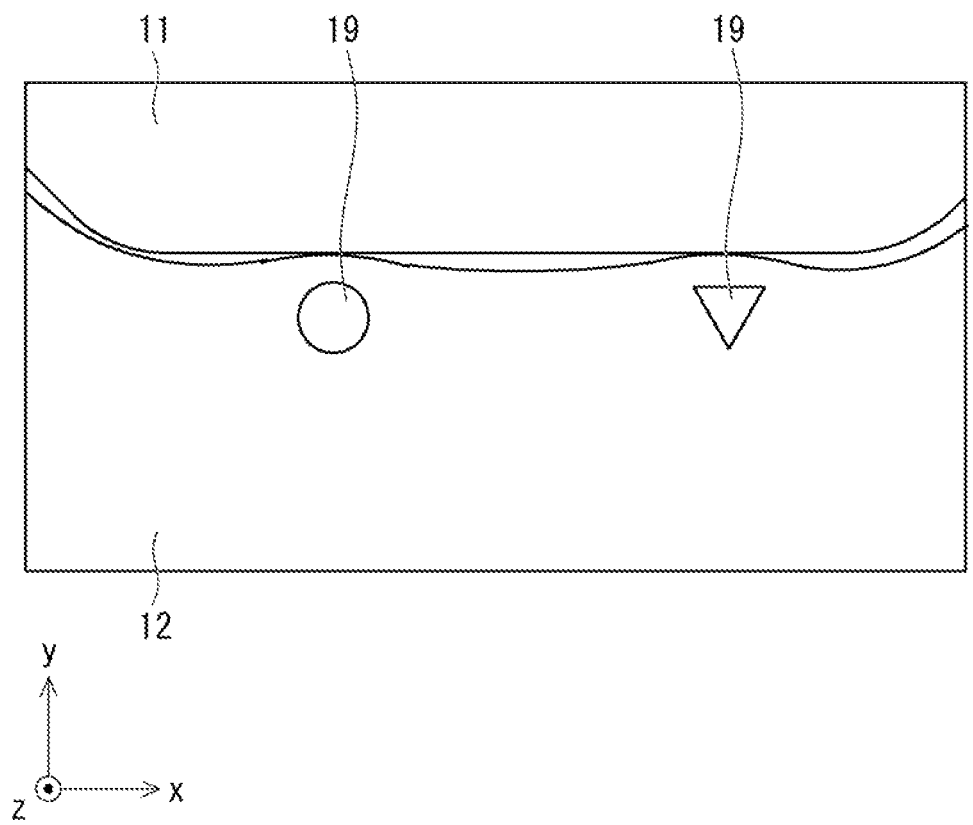
FIG. 5 is a diagram showing an example of penetration holes provided in the rotor core of the rotating electric machine rotor according to the first embodiment of the present disclosure.

FIG. 5 is a diagram showing an example in which the penetration holes 19 are provided inside the rotor core 12. As shown in FIG. 5, the shapes of the penetration holes 19 may be round, polygonal, and the like, and any shape may be employed.

Accordingly, it is possible to avoid creation of a gap in the fastening unit of the rotor shaft 11 and the rotor core 12 due to the centrifugal force generated when the rotor core 12 is rotating at a high speed.

With the configuration of the rotating electric machine rotor 10 according to the first embodiment, it is possible reduce the stress load on the rotor core 12 while maintaining the restraining between the rotor shaft 11 and the rotor core 12 even when the rotor core 12 is rotating at a high speed.

Second Embodiment

Figure 6:
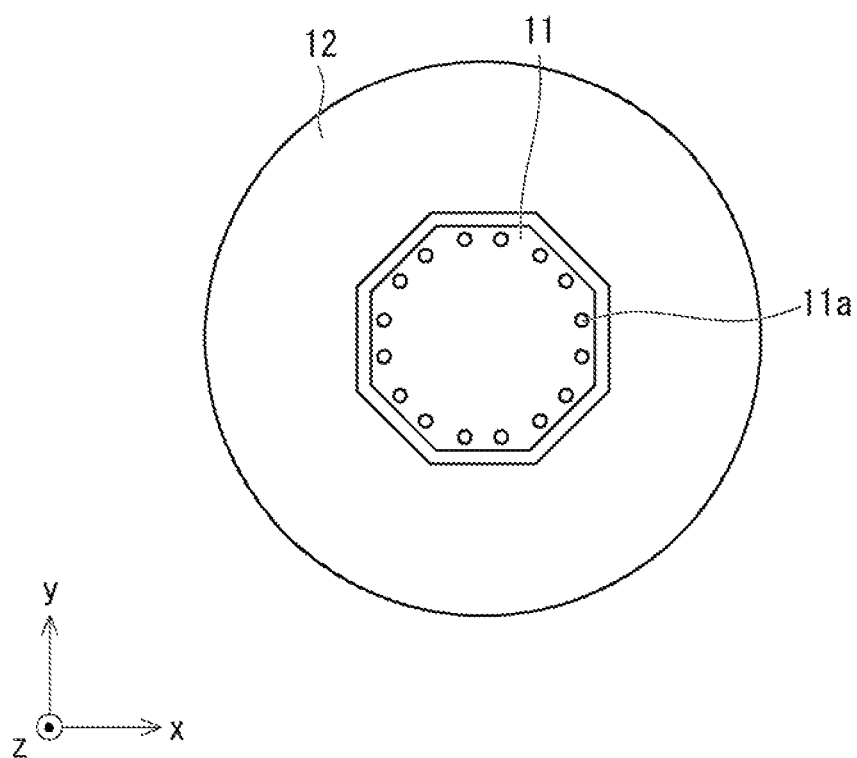
FIG. 6 is a horizontal cross-sectional diagram of a fastening unit of a rotor shaft and a rotor core of a rotating electric machine rotor according to a second embodiment of the present disclosure.

A rotor electric machine rotor 10 according to a second embodiment will be described with reference to FIG. 6. FIG. 6 is a horizontal cross-sectional diagram of a fastening unit of a rotor shaft 11 and a rotor core 12 of a rotating electric machine rotor 10 according to the second embodiment.

As shown in FIG. 6, both the outer peripheral surface of the rotor shaft 11 and the inner peripheral surface of the rotor core 12 according to the second embodiment have an octagonal shape like those according to the first embodiment. Note that the shapes of the above-mentioned surfaces are not limited to an octagonal shape and may be any other polygonal shape. Note that in FIG. 6, the recesses and the projections formed on the inner peripheral surface of the rotor core 12 shown in FIG. 4 are omitted.

The difference between the second embodiment and the first embodiment is that in the second embodiment, a plurality of penetration holes extending in the direction of the axis of rotation of the rotating electric machine rotor 10 are arranged in the circumferential direction at the peripheral edge part of the rotor shaft 11 and a rod-like member 11a is inserted into each penetration hole. The rod-like member 11a is desirably made of metal having a specific gravity higher than that of iron from which the rotor shaft 11 is made, such as tungsten. Further, the rod-like member 11a includes a liner member such as a wire. Further, the peripheral edge part of the rotor shaft has a thickness difference, and by making the amount of deformation of the rotor shaft due to the centrifugal force larger than the amount of deformation of the rotor core due to the centrifugal force, it is possible to avoid creation of a gap in the fastening unit of the rotor shaft 11 and the rotor core 12.

As shown in FIG. 6, by inserting the rod-like members 11a into the rotor shaft 11, the outer diameter of the rotor shaft 11 becomes large due to the centrifugal force caused when the rotor shaft 11 is rotating at a high speed. Therefore, it is possible to avoid creation of a gap in the fastening unit of the rotor shaft 11 and the rotor core 12.

With the configuration of the rotating electric machine rotor according to the second embodiment, it is possible reduce the stress load on the rotor core while maintaining the restraining between the rotor shaft and the rotor core even when the rotor is rotating at a high speed.

From the disclosure thus described above, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A rotating electric machine rotor comprising:
   a rotor shaft extending in a direction of an axis of rotation; and
   a rotor core fixedly fitted to an outer circumference of the rotor shaft and formed of laminated steel sheets, wherein
   an inner diameter of the rotor core is smaller than an outer diameter of the rotor shaft,
   an inner edge part of each laminated steel sheet is made thinner than an outer edge part thereof, and the inner edge part abuts on an outer peripheral surface of the rotor shaft and is curved along the outer peripheral surface of the rotor shaft in the direction of the axis of rotation,
   the rotor core has recesses and projections formed on an inner peripheral surface thereof, and
   a penetration hole extending in the direction of the axis of rotation is provided in each projected part of the recesses and the projections.

2. The rotating electric machine rotor according to claim 1, wherein the outer peripheral surface of the rotor shaft and an inner peripheral surface of the rotor core are polygonal in cross section.

3. A rotating electric machine rotor comprising:
   a rotor shaft extending in a direction of an axis of rotation; and
   a rotor core fixedly fitted to an outer circumference of the rotor shaft and formed of laminated steel sheets, wherein
   an inner diameter of the rotor core is smaller than an outer diameter of the rotor shaft,
   an inner edge part of each laminated steel sheet is made thinner than an outer edge part thereof, and the inner edge part abuts on an outer peripheral surface of the rotor shaft and is curved along the outer peripheral surface of the rotor shaft in the direction of the axis of rotation,
   a plurality of penetration holes extending in the direction of the axis of rotation are arranged at a peripheral edge part of the rotor shaft in a circumferential direction thereof, and
   a rod-like member made of metal having a specific gravity higher than that of metal from which the rotor shaft is made is inserted in each of the plurality of penetration holes.

\* \* \* \* \*